United States Patent [19]

Schwartz

[11] Patent Number: 4,634,863

[45] Date of Patent: Jan. 6, 1987

[54] NUCLEAR DETECTOR SYSTEM WITH REDUCED DEAD-TIME PROCESSOR CIRCUIT

[75] Inventor: Robert J. Schwartz, Houston, Tex.

[73] Assignee: Halliburton Company, Duncan, Okla.

[21] Appl. No.: 594,445

[22] Filed: Mar. 28, 1984

[51] Int. Cl.[4] ............................ G01V 5/04; G01T 1/17
[52] U.S. Cl. .................................... 250/262; 364/177; 364/422
[58] Field of Search .............. 364/177, 422, 572, 574, 364/825, 828, 829; 250/262, 261

[56] References Cited

FOREIGN PATENT DOCUMENTS 739449 6/1980 U.S.S.R. ............................... 250/262

OTHER PUBLICATIONS

R. A. Boie, A. T. Hrisoho and P. Rehak, "Signal Shaping and Tail Cancellation for Gas Proportional Detectors at High Counting Rates", *Nuclear Instruments and Methods*, vol. 192, Nos. 2-3, (Feb. 1982), pp. 365-374.

*Primary Examiner*—Alfred E. Smith
*Assistant Examiner*—Constantine Hannaher
*Attorney, Agent, or Firm*—William J. Beard

[57] ABSTRACT

For use in a well logging tool which responds to randomly spaced pulses of different amplitudes, a pulse processing circuit featuring reduced dead-time is incorporated. Typically, it can be used with either a gamma ray or neutron detector. The circuit enables mixed amplitude pulses with irregular spacing to be processed with relatively different rise and fall times. The circuit processes the trailing or following portion of a pulse differently from the leading or rising portion to enable a separate following second pulse to be observed.

18 Claims, 4 Drawing Figures

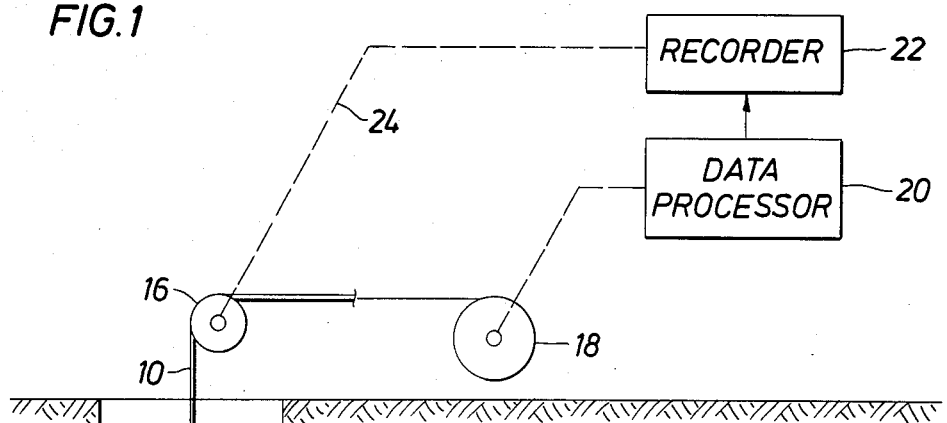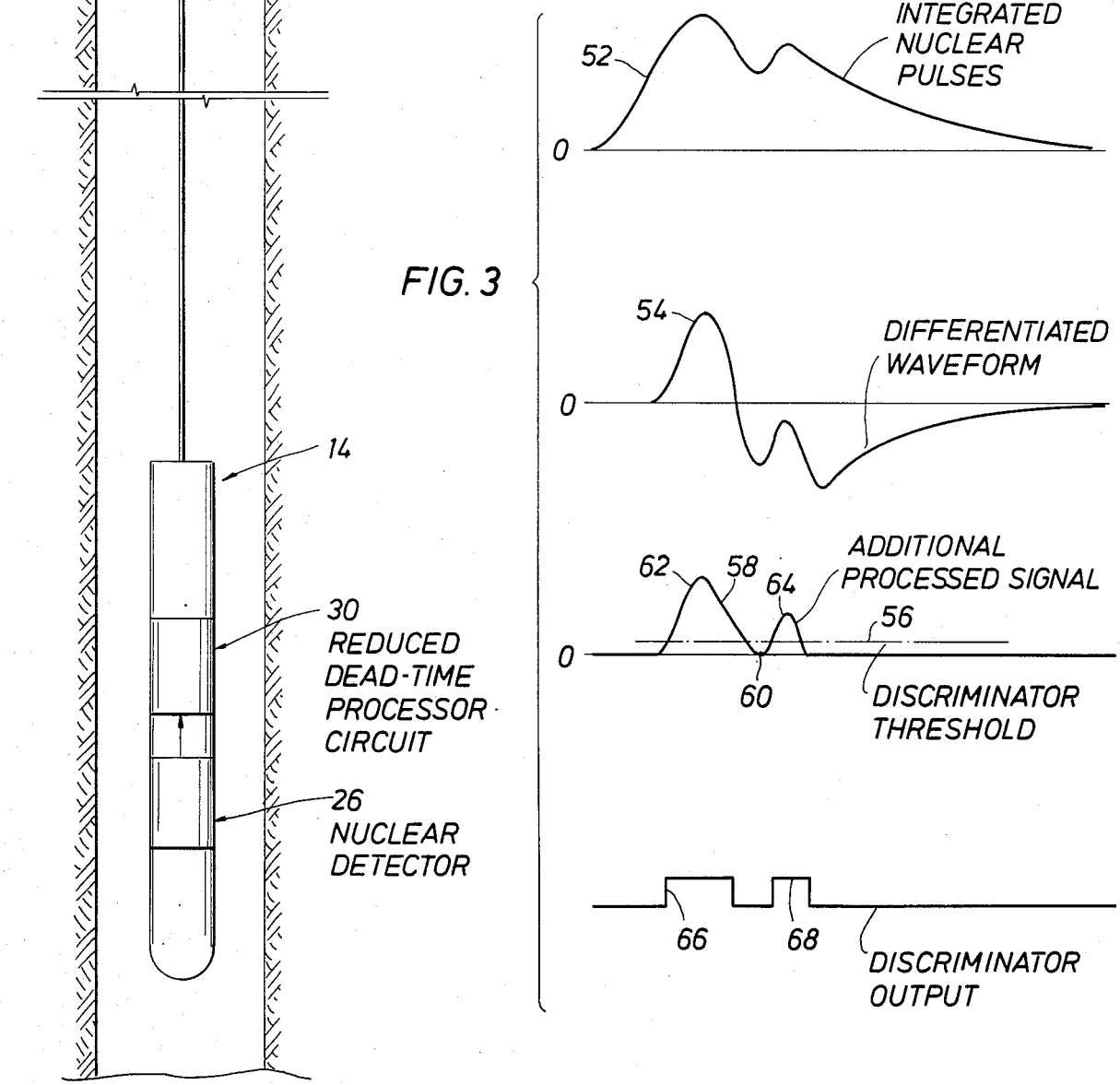

NUCLEAR DETECTOR SYSTEM WITH REDUCED DEAD-TIME PROCESSOR CIRCUIT

BACKGROUND OF THE DISCLOSURE

In down hole well logging devices radioactive phenomena are utilized to measure various properties of the formations adjacent to the well borehole. Typical techniques utilize gamma ray or neutron irradiation procedures and hence require detectors. The output signal of such detectors is a random mix of pulses of different spacing and different amplitude. The nuclear events need to be accurately captured and reproduced to obtain accurate analysis.

Typically, the output of a nuclear detector is integrated to recover the entire energy of each pulse of the nuclear detector. This results in a pulse waveform that rises relatively rapidly but collapses relatively slowly. This wave form is typically linearly amplified to a level sufficient to enable the signal to be input to a discriminator circuit. The discriminator has an adjustable threshold value. Thus, signal levels above the threshold are significant and those which are below the threshold value are not significant. Because the nuclear events are random in amplitude as well as frequency, the setting of the threshold value in the discriminator may very well modify the output signal from the discriminator.

While the events may occur in a random distribution, as the number of events in a given interval increases, there is an increasing probability that first and second nuclear events will overlap before the system including the linear amplifier and discriminator has finished processing the prior event. This provides overlapping events wherein the signal processing is dependent on the relative amplitude and spacing between the events. Accordingly, dead-time is defined as that interval wherein the system is unable to respond to the trailing event because it is too closely spaced to the preceeding event. This minimum time or dead-time describes a limitation on the data processing capacity of the system. Dead-time exists in all the components of the signal processing circuitry. As will be understood, signal dead-time is cumulative for the system. As the average rate of the events occuring at the nuclear detector approaches a rate corresponding to the reciprocal of system dead-time, the ability of the system to count individual events decreases significantly. Corrections based upon system dead-time can be implemented, but as such corrections increase system accuracy is reduced. A reduction in dead-time reduces the corrections which might otherwise be necessary and thereby improves system accuracy.

This system utilizes a reduced dead-time signal processing circuit involving a charging capacitor at the output of a differentiating circuit. Thus, the event is first detected, input to an integrator circuit, that signal is then amplified, and the amplified output is then differentiated. The differentiated signal is input to a series capacitor. On the output side of the capacitor, the fall time is made much more rapid than at the input side. This is accomplished by connecting appropriately biased diodes to the output side of the capacitor with a view of changing the capacitor output fall time. Thus, this change in slope on the back side of a nuclear event coupled through the capacitor enables the next following nuclear event to be separated from the prior event. This more rapid change in the fall time on the back side of a particular pulse shortens the dead-time and enables the next pulse to be observed sooner. That is, the trailing pulse, even if significantly smaller, is more readily observed because the dead-time has been modified to enable the prior larger or smaller pulse to clear the capacitor as a result of the modified fall time (the trailing edge) of the prior pulse.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 illustrates a sonde supported on a logging cable in a wellbore and having a nuclear detector which forms an output signal input to the reduced dead-time processor circuit of the present invention;

FIG. 3 is a view similar to FIG. 2 showing modification of the processed signals accomplished by the circuit of this disclosure.

DETAILED DESCRIPTION OF THE PREFERRED EMBODIMENT

Figure 2:
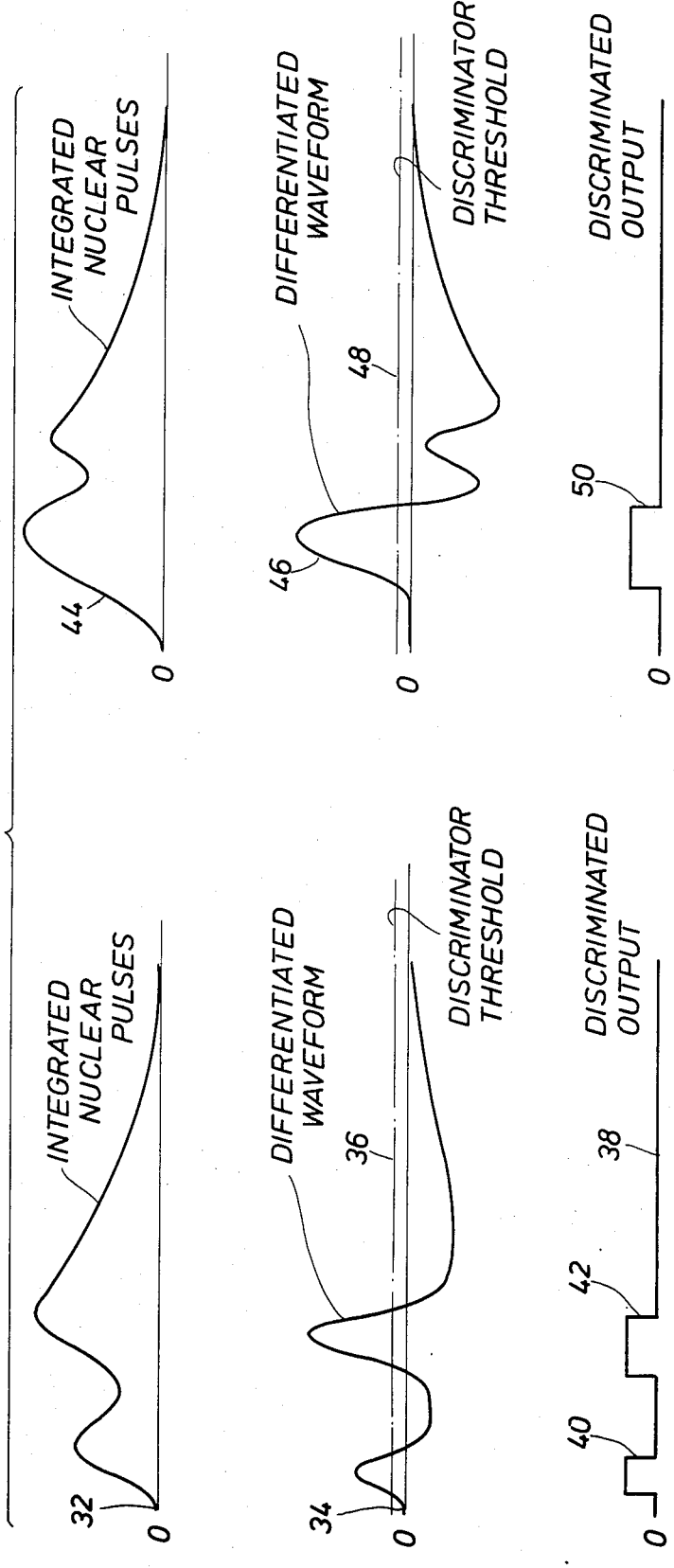
FIG. 2 is a series of wave forms describing closely spaced individual pulses and processing thereof for a discriminator circuit to obtain individual pulse outputs for the nuclear events observed by the detector.

In FIG. 1 of the drawings, an armored well logging cable 10 is suspended in a well borehole to support a sonde 14. The sonde is lowered to the bottom of the well and is retrieved on the logging cable. The logging cable passes over a sheave 16 and is spooled on a reel or drum 18. Typically, the logging cable will be multiple thousands of feet in length. It includes various conductors as required, and a signal conductor path through the logging cable 10 is output to a data processor 20. The data processor converts the data provided over the logging cable 10 into a format for recording by a data recorder 22. The data is normally recorded as a function of depth of the sonde 14 in the borehole 12. A mechanical or electronic depth measuring device 24 is connected to measure the position of the sonde 14 in the borehole and this data is input to the recorder 22 so that the data is recorded as a function of depth. The device 24 is normally connected to the sheave 16.

The sonde 14 includes a nuclear detector 26. The precise nature and form of the nuclear detector can vary. It typically responds to pulses from individual nuclear events such as the passage of a gamma photon. Another type of device is a detector for neutron radiation. In either case, the output signal is a plurality of randomly spaced nuclear events of different amplitudes. The nuclear detector 26 can therefore have various forms and is a device which forms an output signal of randomly spaced pulses of differing amplitudes.

The nuclear detector 26 forms an output signal which is supplied to the reduced dead-time processor circuit 30 of this disclosure. That circuit is better shown in FIG. 4 and will be described after a discussion of the wave forms shown in FIG. 2.

In FIG. 2, the wave form 32 is a typical wave form observed where there is a small first pulse and a closely spaced larger second pulse. The wave form 32 is the integrated output signal of the two pulses. The shape of the wave form 32 clearly indicates that there are two events, even though they have relatively different sizes. The wave form 34 is the differentiated signal obtained from the wave form 32. This wave form is differentiated to assist or enhance separation of the two pulses which originated the wave form 32. The level 36 in FIG. 2 defines the discriminator threshold value. This threshold determines the level at which the discriminator is operated. Thus, the discriminator output signal 38 includes a small first pulse 40 and a larger trailing pulse 42. The pulses 40 and 42 clearly aid and assist in accurate data processing of the nuclear pulses which include a small first pulse and a larger second pulse. Differences in pulse amplitides are reflected in the different widths of the pulses 40 and 42.

The wave form 32 presumes a small first pulse and a large second pulse. The wave form 44 presumes a large first pulse and a smaller trailing pulse. The wave form 44 is differentiated to obtain the wave form 46. That wave form is compared with the discriminator threshold level at 48. The discriminator output forms a signal pulse 50. The large first pulse obscures the trailing smaller second pulse. As will be understood, there is a loss of data because the dead-time between the first and second pulses (clearly shown in the wave form 44) obscures the smaller trailing pulse. It can be understood that even in the first case with waveform 32 as the larger trailing pulse occurs earlier in time or closer to the peak of the first smaller pulse, that even with normal differentiations, the baseline may not be reached on the trailing portion of the first smaller pulse and the discriminator may not recover thus not resolving both pulses.

Attention is directed to FIG. 3 of the drawings for a description of the operation of this apparatus, namely, in isolating the pulses which tend to run together whereby a modified trailing edge fall time assists in pulse separation. To this end, the wave form 52 in FIG. 3 is very similar to the wave form 44 and is a result of a large first pulse and relatively small trailing or second pulse. Again, this wave form is differentiated to obtain the wave form 54. The next wave form in FIG. 3 is referenced against the discriminator threshold value 56. The peak signal 62 is provided with a trailing edge 58. The trailing edge fall time is different than the rise time. The trailing edge 58 thus falls toward the base line value much more rapidly than shown in the wave form 52. The trailing edge 58 thus falls so rapidly that it enables the two pulses to be separated by the interval whose potential lies below the discriminator threshold value 56. That is, the larger first pulse 62 and the small trailing pulse 64 are separated because there is a short segment of signal below the discriminator threshold 56. Moreover, both peaks extend above the discriminator threshold value 56. The pulse separation shown in this wave form is thus obtained by modification of the trailing edge fall time.

In FIG. 3, the peaks 62 and 64 are thus converted into binary pulses 66 and 68, the pulses having durations sufficient to enable both pulses to be observed and converted into pulse wave forms for subsequent processing. That is, the smaller trailing peak is not obscured by the larger first peak and the two output pulses are thus obtained for subsequent processing.

Figure 4:
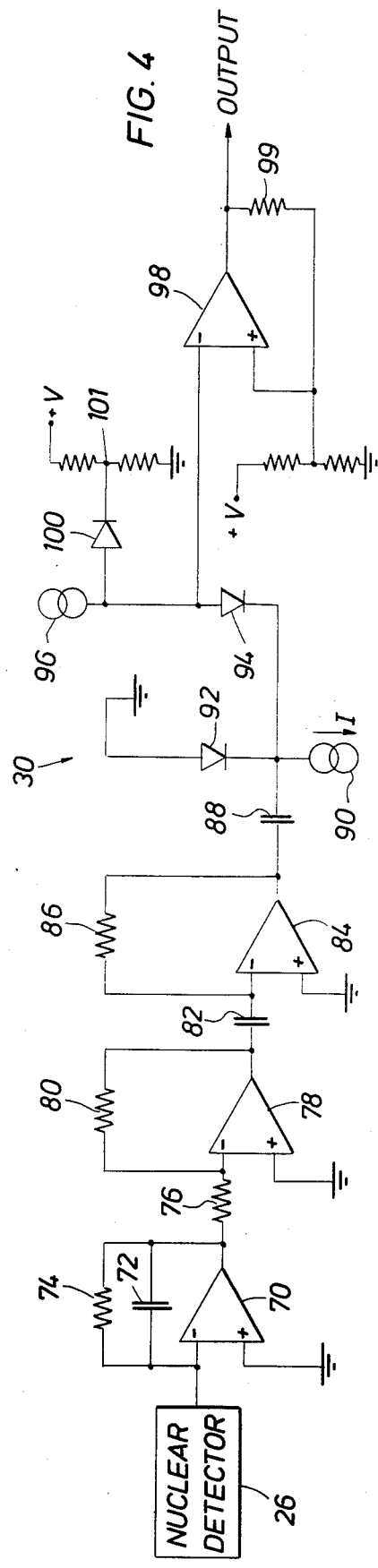
FIG. 4 is a schematic block diagram of the reduced dead-time processor circuit of this disclosure which circuit processes the output signal of a nuclear detector.

In FIG. 4 of the drawings, the numeral 30 indicates the system which is shown in FIG. 1. It is connected to the nuclear detector 26. A polarity for the output of the nuclear detector 26 is presumed, and a nuclear event is thus illustrated as a negative going pulse. Quite obviously, an inverting amplifier can be incorporated if positive going pulses occur or the circuit polarities can be reversed.

The negative going pulse from the nuclear detector 26 occurs in random sequence and has an amplitude within a specified range exceeding some threshold value for operation of the pulse measuring system responsive to the nuclear detector 26. The apparatus incorporates an integrator circuit which is formed of an amplifier 70 having a feedback capacitor 72. The circuit additionally includes an optional large feedback resistor 74. The capacitor 72 and amplifier achieve pulse integration. The output signal is supplied through a series resistor 76 and is input to a linear amplifier 78. The amplifier 78 has a feedback resistor 80 to control gain to form an amplified output signal. Signal inversion also occurs in this amplification stage.

The output of that device is supplied to a series capacitor 82. This enables the signal to be differentiated. The differentiated signal is observed by another amplifier circuit 84 having a suitable feedback resistor 86 around the amplifier. This differentiated signal is then provided to a series capacitor 88. The capacitor 88 would ordinarily perform a subsequent differentiation. Because of this, it has a rise and fall time which is ordinarily determined by circuit component values. In this arrangement, however, the rise and fall time on the output side of the capacitor 88 is modified in a manner to be described.

The numeral 90 identifies a current generator. It provides a specified current flow I. This current flow in the quiescent state is through two identical diodes 92 and 94. The diodes 92 and 94 have identical temperature characteristics. They also have identical forward drop values. They are also selected to have identical thermal drift characteristics with change of temperature. It will be understood that half the current for the current generator 90 flows each of the two diodes. Another current source 96 is included, and it furnishes half the current for the current generator 90. As will be observed, this current flows through the diode 94 up to the voltage capability of current generator 96. The diode 94 functions primarily as a level shifter compensating for the voltage drop across the diode 92 when it is conducting.

Consider now the operation of the circuit. In the absence of pulses, or in other words under steady-state conditions I is divided equally between diodes 92 and 94 to cause the cathodes of both diodes to rest at a potential of typically less than 1 volt below ground. Since the anode of diode 92 is connected to ground the current through both diodes is equal, the potential at the anode of diode 94, connected to the input of the discriminator 98 is also at ground level.

The value of the capacitor 88 is chosen in conjunction with the current I so that minimal change in potential across the capacitor 88 occurs during the rising portion of the signal input to the capacitor 88. Thus there is negligible attenuation of the leaading edge of the input pulse.

When a positive going input pulse occurs, the cathode of diode 92 rises in potential causing current flow through the diode 92 to decrease, or even cease. This positive going pulse is coupled through the diode 94 to the input of the discriminator 98. When the pulse at the input of the capacitor reaches its peak, half of the current flow I is diverted to the output side of the capacitor 88 to charge in a negative going direction, causing the output of the capacitor 88 to fall relatively rapidly. As the input signal to the capacitor 88 passes the peak and begins to slowly collapse, this negative going input peak coupled through the capacitor 88 adds to the negative going charge from current flowing from the current source 90, causing an even more rapid fall at the output side of the capacitor 88. When the output potential of the capacitor 88 falls sufficiently below ground so that the diode 92 begins to conduct, the diode 92, acting as a catch diode, provides a low impedance path to discharge in a very short time the accumulated charge on capacitor 88 thus preventing any further fall in potential of the output of the capacitor 88. Thus the coupling circuit is almost immediately able to response to the next positive going portion of the input waveform even if the input waveform has not fully collapsed or recovered due to the first pulse.

The circuit shown in FIG. 4 can be tested and observed at ambient temperatures. The two diodes are incorporated to provide a temperature compensation means for the circuit. That is, the diodes 92 and 94 drift together with change of temperature. This system is intended to be used at temperatures ranging from ambient up to the typical temperature levels experienced in deep wells, and that change in temperatures changes the performance of the diodes 92 and 94. The forward drop of both diodes is temperature dependent and they are equal when exposed to a common temperature and equal current. Accordingly, the static or quiescent signal output by the system is independent of temperature because the two diodes drift with temperature in like fashion and drift changes cancel.

The output signal is supplied to an amplifier 98 illustrated as functioning as a discriminator. The amplifier 98 is a differential amplifier provided with a second input. This second input is at a fixed level, and this level can well be the discriminator threshold value 56 shown in FIG. 3. That level is normally set and fixed. If it is adjusted, such adjustments can be obtained by altering the resistors which determine the discriminator input voltage. The amplifier 98 is thus overdriven so that analog signal inputs to it cause overdriving, thereby forming a square wave as the amplifier 98 is driving to saturation. A resistor 99 may be used to provide controlled positive feedback to the amplifier 98 to shorten the transition time when responding to an input pulse. The function served by amplifier 98 may also be accomplished by use of a circuit commonly referred to as a comparator.

While illustrated but not originally described, a diode 100 may be connected with its anode connected to the anode of diode 94 and its cathode to a source of positive potential 101, higher than the discriminator level 56 (FIG. 3). This catch diode 100 functions to (1) limit the positive excursion of the waveform applied to the discriminator 98; and (2) divert the current flow from current source 96 on large amplitude signals so that the full current I from the current source 90 instead of half of I, is applied to the capacitor 88. This will shorten the fall-time of the upper portion of a large amplitude pulse by a factor of two and further reduce the dead-time on large amplitude pulses.

From the foregoing description, it will be understood how the reduced dead-time processor circuit 30 in FIG. 4 separates adjacent pulses by reducing the dead-time between pulses. The reduction in dead-time is achieved by modifying the fall time after the peak of the first pulse. This takes advantage of the fact that the current source 90 continues to provide current flow and yet the diodes 92 and 94 block that current flow thereby diverting the current flow to discharging the capacitor 88. This assists in obtaining the rapid fall time 58 shown in FIG. 3 so that the signal is restored to the base line value 60. This enables the subsequent small pulse 64 to pass through the reduced dead-time processor circuit 30 and yet be recognized as a independent and separate signal.

Since this reduces the system dead-time, it increases the maximum pulse rate of the system.

While the foregoing is directed to the preferred embodiment, the scope is determined by the claims which follow.

What is claimed is:

1. For use in a well logging system which has a nuclear event detector forming an output signal of randomly spaced peaks having amplitudes within a specified range, a reduced dead-time processor circuit which comprises:
    (a) input means adapted to be connected with a nuclear event detector in a sonde to provide an input signal having pulses occurring at random spacing and wherein the pulse amplitudes are within a specified range;
    (b) a signal path through the circuit from said input means wherein the signal path includes a series capacitor means having an output side, and further including a discriminator connected to the output side of said capacitor means, said capacitor means providing a signal to said discriminator for forming an output pulse indicative of a nuclear event input thereto;
    (c) a current source connected to the output side of said capacitor means for controllably providing a charging current to said capacitor means; and
    (d) biased diode means connected to the output side of said capacitor means for selectively controlling and blocking current flow paths for current from said current source, said diode means directing current flow from said current source to said capacitor means during the trailing edge of pulses in the signal flowing along said signal path to shorten the fall time of such pulses.

2. The apparatus of claim 1 wherein said diode means includes first and second similar diodes wherein half of the current flow from said current source flows through each of said two diodes.

3. The circuit of claim 1 further including a series differentiating circuit in said signal path connected to said capacitor means wherein said capacitor means is provided with the differentiated input signal.

4. The apparatus of claim 1 wherein said diode means comprises a diode connected to a bias voltage causing said diode to selectively conduct dependent on the comparative voltage bias at said diode relative the voltage output at said capacitor means.

5. The apparatus of claim 4 including a second diode serially in said signal path connected to the output of said capacitor means, and further including a second current source connected to said second diode to form a current flow through said second diode less than the current flow of said current source.

6. The apparatus of claim 4 including a bias voltage source comprising a fixed voltage level.

7. The apparatus of claim 6 wherein said diode is connected to ground.

8. The apparatus of claim 4 including two diodes both connected at their cathodes to said capacitor means at the output side thereof, and wherein the current flow from said current source is directed by bias control of said diodes, the current flow selectively directed to said capacitor means to increase the rate of charging on said capacitor means.

9. The apparatus of claim 8 wherein said two diodes have similar forward drops, and similar temperature dependent characteristics.

10. The apparatus of claim 1 wherein said capacitor means is connected at the output of differentiating current means in said signal path.

11. The apparatus of claim 10 including a differential amplifier having two inputs, one being in said signal path and the other being connected to a voltage bias, and wherein said amplifier is overdriven to convert a pulse into a clipped waveform.

12. The apparatus of claim 1 including means adjusting the level of operation of said discriminator.

13. The apparatus of claim 1 including a feedback amplifier comprising said discriminator.

14. The apparatus of claim 1 including a high peak voltage, diode blocked, supplemental current source connected to flow charging current to said capacitor means after passage of high peak voltage.

15. The apparatus of claim 1 including voltage limiting means connected to limit the output voltage of said capacitor means to said discriminator.

16. The apparatus of claim 1 including means connected to the output side of said capacitor means and to said current source to provide a current flow switching to a higher flow during the trailing edge of pulses.

17. The method of processing peak voltage signals indicative of nuclear events observed in a well logging procedure in which the nuclear events are crowded to overlapping as signal peaks, the method comprising the steps of:
 (a) supplying the peak voltage signal to a capacitor means having an output side; and
 (b) supplying a charging current to the output side of the capacitor means only after a peak voltage has passed to decrease signal fall time compared to signal rise time before the peak voltage has passed wherein the charging current is terminated after the signal on the output side of the capacitor means falls to a specified value.

18. The method of claim 17 further including the step of continuing a current flow from a current source means through a steering diode means to interrupt current flow to the output side of the capacitor.

* * * * *